H. W. WELD.
ORNAMENTAL SHEET GLASS.
APPLICATION FILED JUNE 14, 1916.

1,220,576.        Patented Mar. 27, 1917.

Witnesses:

Inventor
Herbert W. Weld.
By Albert E. Bill
Atty.

UNITED STATES PATENT OFFICE.

HERBERT W. WELD, OF CHICAGO, ILLINOIS.

ORNAMENTAL SHEET-GLASS.

1,220,576.   Specification of Letters Patent.   Patented Mar. 27, 1917.

Application filed June 14, 1916. Serial No. 103,613.

*To all whom it may concern:*

Be it known that I, HERBERT W. WELD, a citizen of the United States, residing at Chicago, in the county of Cook and State of Illinois, have invented a certain new and useful Improvement in Ornamental Sheet-Glass, of which the following is a specification.

My invention relates to an improved form of ornamental sheet glass in which similar unit projections are arranged in rows extending in two directions across the sheet at an angle to each other, said projections being of greater length than width and formed on both sides of the sheet in substantially the same arrangement, the only difference being that the arrangement on one side of the sheet is displaced alternately with the arrangement on the first side of the sheet, or as I prefer to designate it, is reciprocated substantially 50% with the arrangement on the first side of the sheet.

More specifically my invention relates to the making of the unit projections referred to elliptical in form or of a curved outline having a greater length than width and preferably of a small height compared with the width.

In carrying out my invention I prefer also to make the projections of such a size that they nearly touch each other, so that the projections on one side of the glass overlap the outlines of the projections on the other side of the glass as a result of which since I prefer to make the sheets of clear glass the projections coöperate to diffuse the light passing through the glass so as to produce a pleasing effect without involving an appreciable loss of light.

My invention is shown in a preferred embodiment in the accompanying drawings in which—

Similar numerals refer to similar parts throughout the several views.

Figure 1:
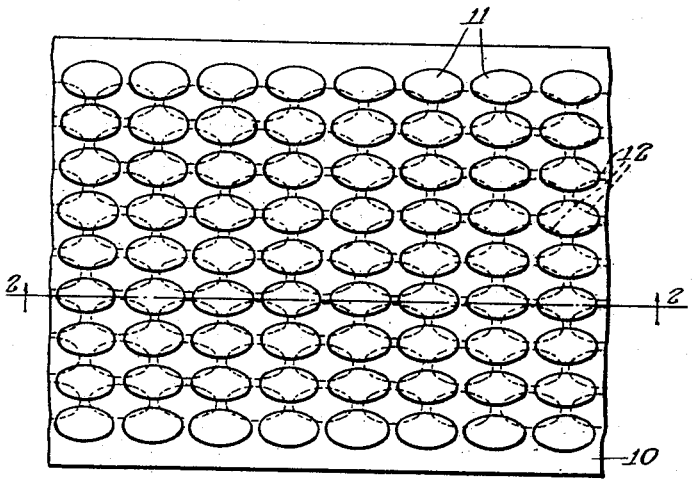
Figure 1 shows a sheet of glass in plan view.
Figure 2:
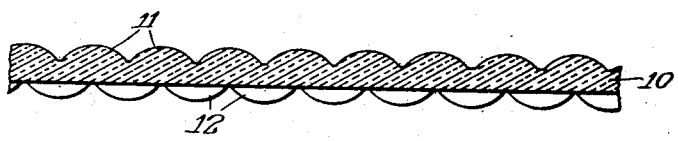
Fig. 2 is a sectional view of the sheet of glass shown in Fig. 1 taken along the line 2—2.

As shown in the drawings the sheet of glass 10 is provided on its surface nearer the observer with a plurality of similar projections 11 of elliptical outline, the centers of which are arranged in rows extending in two directions across the sheet of glass at an angle to each other. The projections are preferably of a size such that the amount of clear space between them on the surface of the glass is small, and while the projections may have any desired depth I prefer to have it somewhat less than half of the minor axis of the elliptical outline.

The other side of the sheet of glass is provided with a similar arrangement of similar projections 12, the only difference being that the centers of the projections 12 are alternated with the centers of the projections 11, or as I prefer to term it, they are reciprocated substantially 50% relatively to the centers of the projections 11.

By forming the projections of greater length than width, whether the surface of the projection is of regular curvature or not I find that each projection is free from the tendency to concentrate light passing through it to any marked degree since even with a surface of regular curvature there would be but two meridians having the same radius of curvature. Each projection therefore is of itself a light diffuser, and the joint effect of the projections on one side of the glass acting with those on the other side of the glass is to completely break up the light passing through the glass and diffuse it evenly.

This is greatly to be desired in connection with glass used for windows and partitions in buildings, where it is necessary that the glass shall obscure the vision without materially interfering with the passage of the light through the glass. With glass constructed in accordance with the present invention there is little loss due to the transmission of the light through the glass for I prefer that the glass shall be clear, and I depend entirely upon the diffusing effect of the projections referred to, to secure the semi-obscure condition which prevents seeing through the glass. While I have shown the projections arranged in rows substantially at right angles to each other it is not necessary that the rows should be given such a relation for if preferred the rows may be somewhat inclined to each other if desired.

While I have shown my invention in the particular embodiment above described I do not, however, limit myself to that exact construction as I desire to cover by the claims below any equivalent thereof known to the art at the time of the filing of this application.

What I claim is:

1. As an article of manufacture, a sheet of glass having similar projections extending from each surface, the projections on each surface being arranged in parallel rows extending at an angle to each other and the arrangement on one surface being reciprocated substantially 50% to the arrangement of projections on the other surface of said sheet of glass, each projection having a greater length than width.

2. As an article of manufacture, a sheet of glass having similar projections extending from each surface, the projections on each surface being arranged in parallel rows extending at an angle to each other and the arrangement on one surface being reciprocated substantially 50% to the arrangement of projections on the other surface of said sheet of glass, each projection having a greater length than width and said projections extending nearly into contact with each other.

3. As an article of manufacture, a sheet of glass having similar projections extending from each surface, the projections on each surface being arranged in parallel rows extending at an angle to each other and the arrangement on one surface being reciprocated substantially 50% to the arrangement of projections on the other surface of said sheet of glass, each projection being elliptical in outline.

4. As an article of manufacture, a sheet of glass having similar projections extending from each surface, the projections on each surface being arranged in parallel rows extending at an angle to each other and the arrangement on one surface being reciprocated substantially 50% to the arrangement of projections on the other surface of said sheet of glass, each projection being elliptical in outline and said projections extending nearly into contact with each other.

5. As an article of manufacture, a sheet of glass having similar projections extending from each surface, the projections on each surface being arranged in parallel rows extending at an angle to each other and the arrangement on one surface being reciprocated substantially 50% to the arrangement of projections on the other surface of said sheet of glass, each projection being elliptical in outline and the depth of the projections being less than half of the minor axis of the elliptical outline.

6. As an article of manufacture, a sheet of glass having similar projections extending from each surface, the projections on each surface being arranged in parallel rows extending at an angle to each other and the arrangement on one surface being reciprocated substantially 50% to the arrangement of projections on the other surface of said sheet of glass, each projection being elliptical in outline and said projections extending nearly into contact with each other, the depth of the projections being less than half of the minor axis of the elliptical outline.

In witness whereof, I hereunto subscribe my name this 9th day of June, A. D. 1916.

HERBERT W. WELD.

Copies of this patent may be obtained for five cents each, by addressing the "Commissioner of Patents, Washington, D. C."